(12) United States Patent
Schwartz et al.

(10) Patent No.: US 8,034,174 B2
(45) Date of Patent: Oct. 11, 2011

(54) DIARYLIDE YELLOW PIGMENTS

(75) Inventors: Russell Schwartz, Cincinnati, OH (US); Ulrik Cassias, Copenhagen (DK); Palle Chris Nielsen, Klippinge (DK)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 12/937,772

(22) PCT Filed: Apr. 17, 2009

(86) PCT No.: PCT/US2009/040944
§ 371 (c)(1),
(2), (4) Date: Nov. 29, 2010

(87) PCT Pub. No.: WO2009/129455
PCT Pub. Date: Oct. 22, 2009

(65) Prior Publication Data
US 2011/0061564 A1   Mar. 17, 2011

Related U.S. Application Data

(60) Provisional application No. 61/046,124, filed on Apr. 18, 2008.

(51) Int. Cl.
C09B 35/035 (2006.01)
C09B 35/037 (2006.01)
C09B 35/08 (2006.01)
C09B 35/10 (2006.01)
C09B 35/20 (2006.01)

(52) U.S. Cl. ............... 106/496; 106/31.6; 106/31.81; 524/190; 534/561; 534/588

(58) Field of Classification Search ........... 106/31.6, 106/31.81, 496; 524/190; 534/561, 588
See application file for complete search history.

(56) References Cited

U.S. PATENT DOCUMENTS

| 3,529,984 A | | 9/1970 | Bandel et al. | |
| 3,533,818 A | | 10/1970 | Bandel et al. | |
| 3,775,148 A | * | 11/1973 | Bradley | 106/496 |
| 3,776,749 A | * | 12/1973 | McKay et al. | 106/496 |
| 3,877,957 A | * | 4/1975 | Bradley et al. | 106/494 |
| 4,462,833 A | * | 7/1984 | Hays et al. | 106/31.75 |
| 4,602,960 A | * | 7/1986 | Liedek et al. | 106/496 |
| 4,643,770 A | * | 2/1987 | Hays | 106/31.81 |
| 4,648,907 A | * | 3/1987 | Hays et al. | 106/31.61 |
| 4,680,057 A | * | 7/1987 | Hays | 524/190 |
| 4,885,033 A | * | 12/1989 | Blackburn et al. | 106/494 |
| 4,946,509 A | * | 8/1990 | Schwartz et al. | 106/496 |
| 5,021,090 A | * | 6/1991 | Schwartz et al. | 524/190 |
| 5,151,129 A | * | 9/1992 | Morrison et al. | 106/31.8 |
| 5,672,202 A | * | 9/1997 | Stirling et al. | 106/496 |
| 5,716,445 A | * | 2/1998 | Stirling et al. | 106/496 |
| 5,800,609 A | * | 9/1998 | Tuck et al. | 106/496 |
| 5,863,459 A | * | 1/1999 | Merchak et al. | 252/301.16 |
| 5,889,162 A | * | 3/1999 | Hays | 534/581 |
| 6,756,486 B1 | * | 6/2004 | Bindra et al. | 534/581 |
| 2004/0220391 A1 | | 11/2004 | Bach et al. | |

FOREIGN PATENT DOCUMENTS

EP    0 651 025        5/1995
WO    WO99/23172 A1 *  5/1999

OTHER PUBLICATIONS

International Search Report dated May 7, 2010 for Application No. PCT/US2009/040944.
Written Opinion dated May 7, 2010 for Application No. PCT/US2009/040944.

* cited by examiner

*Primary Examiner* — Anthony Green
(74) *Attorney, Agent, or Firm* — McKenna Long & Aldridge LLP

(57) ABSTRACT

A diarylide yellow pigment formed by a coupling reaction of a benzidine and a mixture comprising 4-chloro-2,5-dimethoxy-acetoacetanilide and 2,4-dimethyl-acetoacetanilide. The diarylide yellow pigment has a desirable reddish shade than C.I. Pigment Yellow 83, exists in a solid solution, and contains fewer aromatic amine impurities.

13 Claims, 6 Drawing Sheets

DIARYLIDE YELLOW PIGMENTS

CROSS REFERENCE TO RELATED APPLICATIONS

The present application hereby claims the benefit of the provisional patent application of the same title, Ser. No. 61/046,124, filed on Apr. 18, 2008, the disclosure of which is hereby incorporated by reference in its entirety.

BACKGROUND

Diarylide yellow pigments are well known disazo organic pigments. They are manufactured by tetrazotizing a benzidine to form the tetrazo salt, which is coupled with an acetoacetanilide coupling agent. Examples of acetoacetanilide coupling agents include acetoacetanilide (AAA), acetoacet-m-xylidide (AAMX), acetoacet-o-toluidide (AAOT), acetoacet-p-touidide (AAPT), acetoacet-o-anisidide (AAOA), acetoacet-o-chloroanilide (AAOCA), and acetoacet-2,5-dimethoxy-4-chloroanilide (AADMCA). Common benzidines are 3,3'-dichlorobenzidine (DCB), 2,2',5,5'-tetrachlorobenzidine, 3,3'-dimethoxybenzidine, and 3,3'-dimethylbenzidine, but others are known.

Diarylide yellow pigments produced from DCB and acetoacetanilides constitute a family of pigments produced in large volumes for all the most common uses of organic pigments. Color Index Pigment Yellow 13 (C.I. Pigment Yellow 13), which is produced from tetrazotized 3,3'-dichlorobenzidine and two equivalents of AAMX, and Color Index Pigment Yellow 83 (C.I. Pigment Yellow 83), which is produced from tetrazotized 3,3'-dichlorobenzidine and two equivalents of AADMCA, are examples of such diarylide yellow pigments which possess somewhat different characteristics that will ultimately come from substituents on the acetoacetanilides.

When a mixture of acetoacetanilides is present at the reaction stage, the result will be a mix of pigments, many of which do not have Color Index status. U.S. Pat. No. 3,529,984 describes the formation of a mixture of three pigments when a mixture of two different acetoacetanilides is used, and U.S. Pat. No. 3,533,818 generalizes this concept to as many as six different acetoacetanilides. Both disclosures operate with minimum molar fractions of coupling agent down to approximately 5%. Pigments produced by these methods will exhibit improved application properties in printing inks and lacquers (e.g. increased tinctorial strength, transparency, gloss and lower rheology).

During the formation of C.I. Pigment Yellow 83, AADMCA decomposes resulting in some aromatic amine impurities. These impurities cause health concerns and regulatory compliance issues for products where Pigment Yellow 83 is incorporated. The acetoacetanilide coupling agent AAMX used to form C.I. Pigment Yellow 13 does not have the same stability problem as AADMCA, however, C.I. Pigment Yellow 13 has a much greener shade.

Lower levels of primary aromatic amines can be achieved with C.I. Pigment Yellow 83 by extensive purification but the byproduct amines must be treated and the purification process decreases product yield.

Consequently, a significant need exists for a pigment with a shade similar to C.I. Pigment Yellow 83, yet containing a low level of aromatic amine. There is also a need for a pigment that provides a combination of shade and durability.

An improved pigment may be produce by reacting a two equivalent mixture of AAMX and AADMCA with tetrazotized DCB. The pigment shows a surprisingly red shade over a large composition range, and exhibits an unexpected morphology.

These and other objects and advantages shall be made apparent from the accompanying figures and the description thereof.

BRIEF SUMMARY

The above-noted and other deficiencies may be overcome by providing a diarylide yellow pigment formed by a coupling reaction of tetrazotized 3,3'-dichlorobenzidine and a mixture comprising 25-90% by weight of 4-chloro-2,5-dimethoxy-acetoacetanilide and 75-10% by weight of 2,4-dimethyl-acetoacetanilide.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

Figure 1:
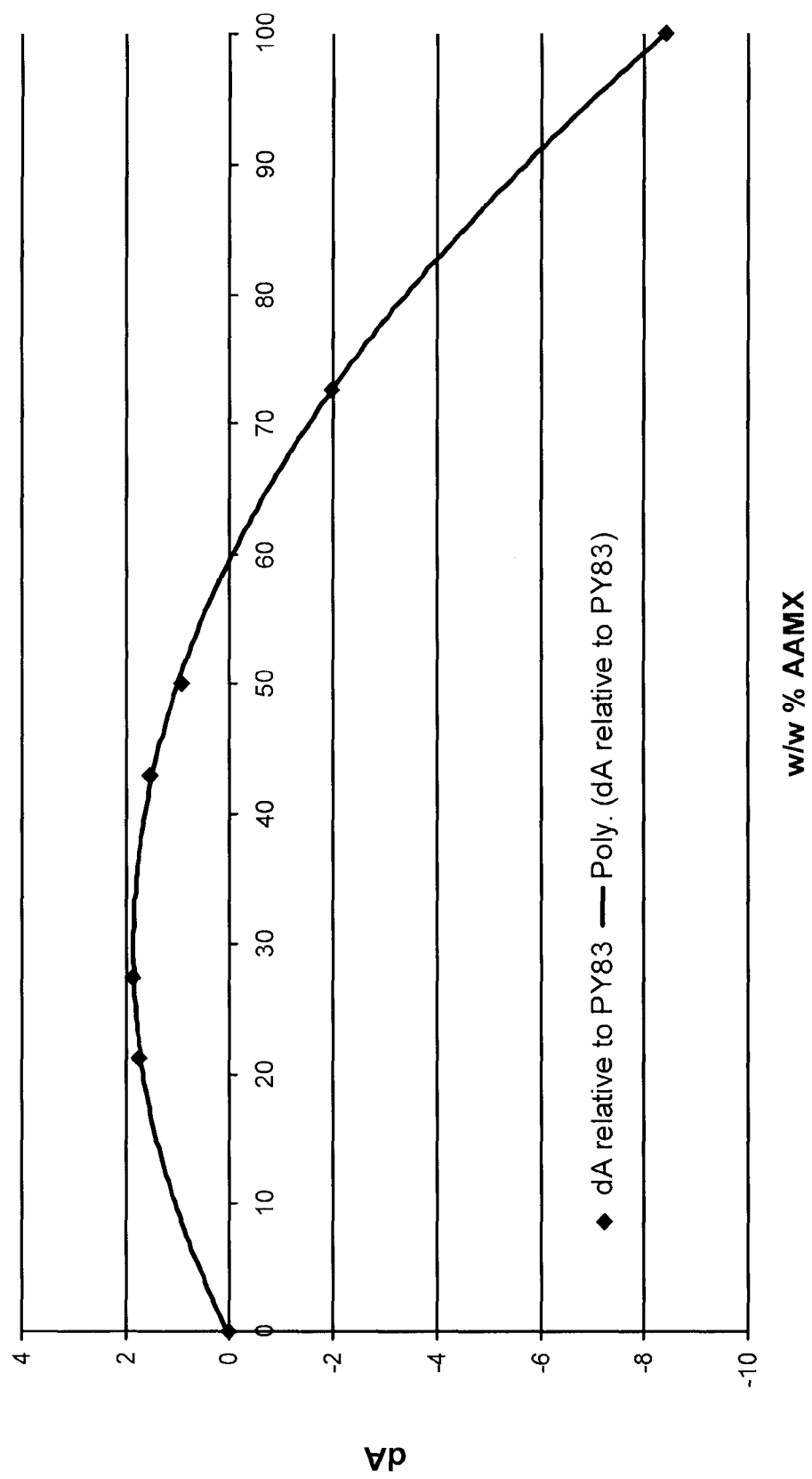
FIG. 1 is the variation of shade with AAMX content.

For many years C.I. Pigment Yellow 83 has held a unique position among organic, yellow pigments because of its distinct reddish shade, high tinctorial strength, good heat resistance, and very good fastnesses to light, weather and solvents. Transparent grades are used in printing inks, often to produce shades of gold on metal foil. Other grades are used in plastic coloration, e.g. polyolefins and PVC, where its heat resistance, minimal migration and fastness properties are valued. Due to the excellent fastness properties and hiding power, a large particle size version is used extensively in the coating industry.

C.I. Pigment Yellow 13 is produced by coupling AAMX to tetrazotized DCB. It produces a pigment that is greener than C.I. Pigment Yellow 83. It has an advantage over C.I. Pigment Yellow 83 because the AAMX coupling agent is more stable to hydrolysis than AADMCA so there is less aromatic amine impurity in the final pigment. In one embodiment there is less than 1200 ppm, 1000 ppm, 800 ppm, 600 ppm, or 500 ppm of aromatic amine impurity. In one embodiment, the pigment has no aromatic amine impurity.

A related pigment, often sold under the commercial trade name C.I. Pigment Yellow 176, is produced by coupling AAMX to tetrazotized DCB; with a small fraction of the AAMX, typically 5-10%, replaced with AADMCA. These pigments produce visually stronger and slightly redder prints than C.I. Pigment Yellow 13 which can translate to higher printing mileage. The pigment may be redder than C.I. Pigment Yellow 83 where the dA is +0.15, +0.30, +0.32, +0.4, +0.5, +1.0, or +1.5.

A diarylide yellow pigment formed by a coupling reaction of tetrazotized 3,3'-dichlorobenzidine and a mixture comprising 25-90% by weight of AADMCA and 75-10% by weight of AAMX is a mixture of di-AADMCA, di-AAMX, and AADMCA-AAMX diarylide molecules. This mixture of molecules forms a solid solution that has a crystal morphology, shade, and to some extent the durability of C.I. Pigment Yellow 83, without a large amount of aromatic amine impurity. Surprisingly the solid solution can be observed in mixtures made with up to approximately 75% AAMX by weight. Mixtures of 95% AAMX and 5% AADMCA exist as a mixture of crystals, not a solid solution.

In one embodiment the diarylide yellow pigment is formed using a mixture comprising from about 30% to about 70% AADMCA and from about 70% to about 30% AAMX. In another embodiment, the mixture comprises from about 35% to about 65% AADMCA and from about 65% to about 35% AAMX. In another embodiment, the mixture comprises from about 40% to about 60% AADMCA and from about 60% to about 40% AAMX. In another embodiment, the mixture comprises from about 45% to about 55% AADMCA and from about 55% to about 45% AAMX.

It is surprising that a diarylide yellow pigment, formed from a mixture comprising up to about 60% AAMX and less than about 40% AADMCA, produces a pigment with a redder shade than C.I. Pigment Yellow 83. At the same time the morphology, as expressed in XRD intensities and Bragg angles, remains similar to that of C.I. Pigment Yellow 83.

The new pigments can be used in plastics, printing inks, paints, in polymeric materials, and other applications where C.I. Pigment Yellow 83 is used.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

Tetrazotized 3,3'-dichlorobenzidine (DCB) was prepared by adding 40.0 parts of DCB to 60.0 parts of 30% hydrochloric acid and 350 parts of water and stirring for 120 minutes with constant speed to form a homogenous suspension. The suspension was cooled with ice to −4° C. A slurry of 22.5 parts of sodium nitrite and 30 parts of water was prepared using a high speed mixer and added rapidly to the DCB suspension. Stirring was continued for 60 min. at a temperature of −2 to 0° C. The excess nitrous acid was then destroyed by the addition of approximately 0.5 part sulfamic acid.

A fine suspension of coupler was prepared by adding 37.0 parts 4-chloro-2,5-dimethoxy-acetoacetanilide, 37.0 parts 2,4-dimethyl-acetoecetanilide, and 2.8 parts of acetoacet-4-sulfanilamide potassium salt to 400 parts of water and 60.0 parts of 28% sodium hydroxide; the mixture was stirred at 35° C. until all solids were dissolved.

A mixture of 800 parts water, 14.8 parts 30% hydrochloric acid and 36.5 parts 66% acetic acid was prepared. 7.4 parts of 70% octadecylamine-octadececyl guanidine polyoxy ethanol and 17.1 parts of 35%. Coco-trimethyl ammonium chloride was added and the mixture was stirred constantly. The temperature of the resulting solution was adjusted to 0° C. with the addition of ice and thereafter the coupler solution was slowly added to form a fine precipitation of coupler. Stirring was maintained throughout coupler preparation and the coupling reaction.

Coupling was then carried out by adding the solution of tetrazotized DCB to the fine suspension of coupler over a period of 90 minutes. The pH of the reaction mixture was kept at approximately 4.5 by simultaneous addition of 14% sodium hydroxide. Stirring was continued until no excess tetrazotized DCB remained. 23.3 parts of polypropoxy ditallow amine was dissolved in 225 parts of water and 3.2 parts of 66% acetic acid at 80° C. and added to the reaction vessel. After adjusting the pH to 10.7 the temperature was increased to 85° C. The resulting pigment slurry was stirred an additional 60 minutes, filtered, washed and spray dried, to afford 133 parts of a pigment yellow mixture.

Example 2-7

A process as in example 1, wherein the weight ratio between 4-chloro-2,5-dimethoxy-acetoacetanilide and 2,4-dimethyl-acetoecetanilide was 100:0, 78.8:21.2, 72.6:27.4, 57.0:43.0, 27.4:72.6 and 0:100.

Example 8

Tetrazotized 3,3'-dichlorobenzidine was prepared as described in example 1.

A fine suspension of coupler was prepared by charging 45.0 parts 4-chloro-2,5-dimethoxy-acetoacetanilide and 34.0 parts 2,4-dimethyl-acetoecetanilide to 200 parts water, 0.8 parts tetra sodium EDTA and 48.0 parts of 28% sodium hydroxide; the mixture was stirred at 35° C. until all solids were dissolved.

A mixture of 520 parts water, 13.5 parts 30% hydrochloric acid and 17.0 parts 66% acetic acid was heated to 35° C. 2.5 parts of tallow dipropylene triamine was dissolved in the acid mixture at 35° C. The temperature of the resulting solution was adjusted to 0° C. with the addition of ice and thereafter the coupler solution was slowly added to form a fine precipitation of coupler. Stirring was maintained throughout coupler preparation and the coupling reaction.

Coupling was then carried out by adding the solution of tetrazotized DCB to the fine suspension of coupler over a period of 120 minutes. The pH of the reaction mixture was kept at approximately 4.5 by simultaneous addition of 14% sodium hydroxide. Stirring was continued until no excess tetrazotized DCB remained and then the temperature was increased to 85° C. The resulting pigment slurry was stirred an additional 60 minutes, filtered, washed and spray dried, to afford 121.3 parts of a pigment yellow mixture.

Example 9

C.I. Pigment Yellow 83

A process as in example 8, wherein only 4-chloro-2,5-dimethoxy-acetoacetanilide was used as a coupler.

Application Example 1

The dry pigments of examples 1-7 were evaluated in a mixed nitrocellulose ink system as follows:

In a 370 ml glass jar were combined 250 g of 2 mm glass beads, 20.0 g of pigment, and 125 g of nitrocellulose varnish. This mixture was shaken on a Skandex shaker for 30 minutes to provide a mill base ink. 5.0 g of this mill base ink was combined with 45.0 g of let down varnish in a 200 ml glass jar and shaken on a Skandex shaker for 5 minutes to provide an ink containing 1.7% pigment. The sample containing only C.I. Pigment Yellow 83 was chosen as reference in all subsequent prints and measurements. Side by side draw downs were made on Lenetta cards using K bar 2, speed 10 on the K control coater. Color strength and characteristics were measured using an ACS color match computer (B-depth 1/3, LAV, spec included). The shade variation with pigment composition is depicted in FIG. 1.

Figure 2:
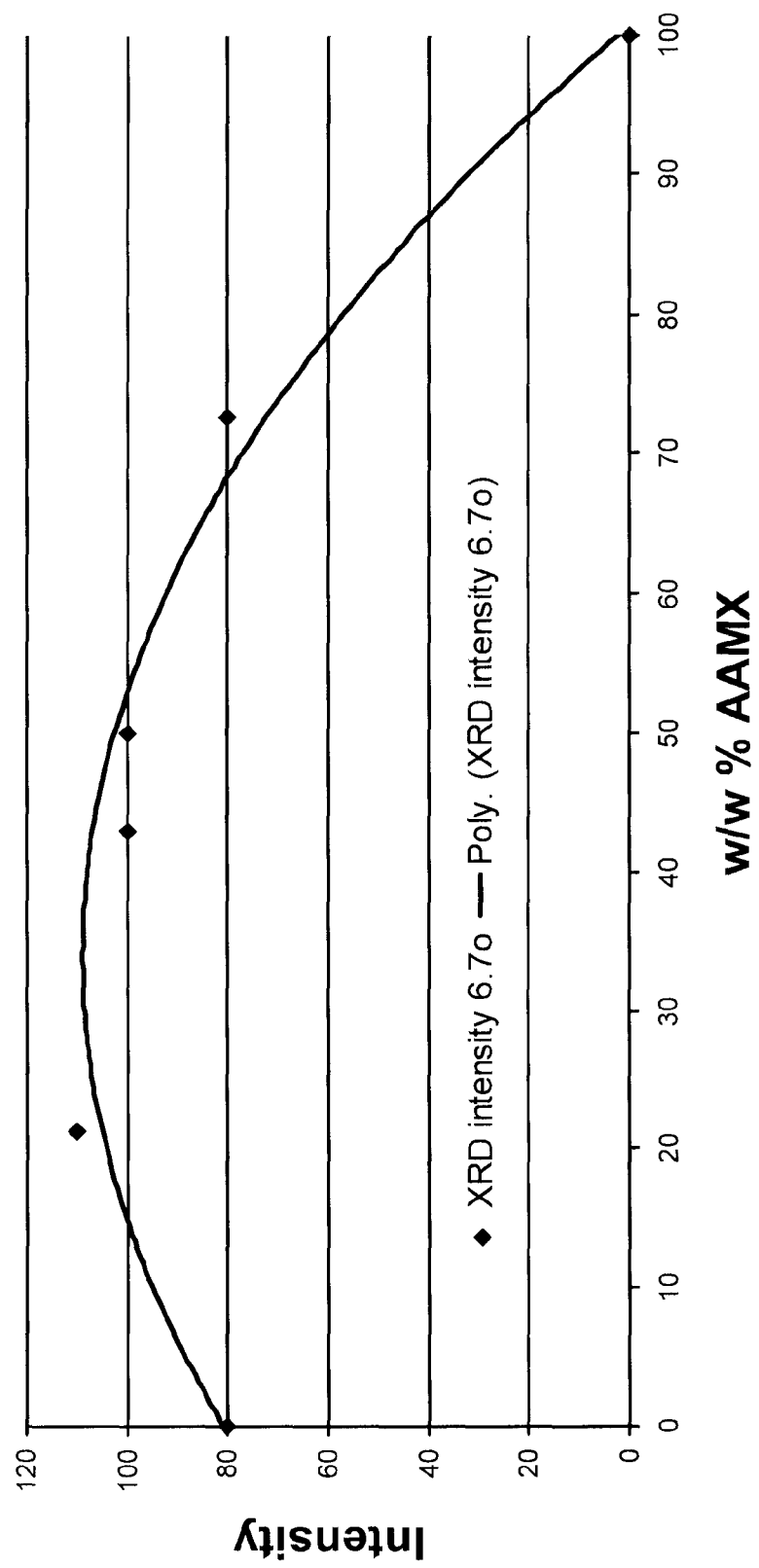
FIG. 2 is the variation of XRD intensity of one particular peak with AAMX content.
Figure 3:
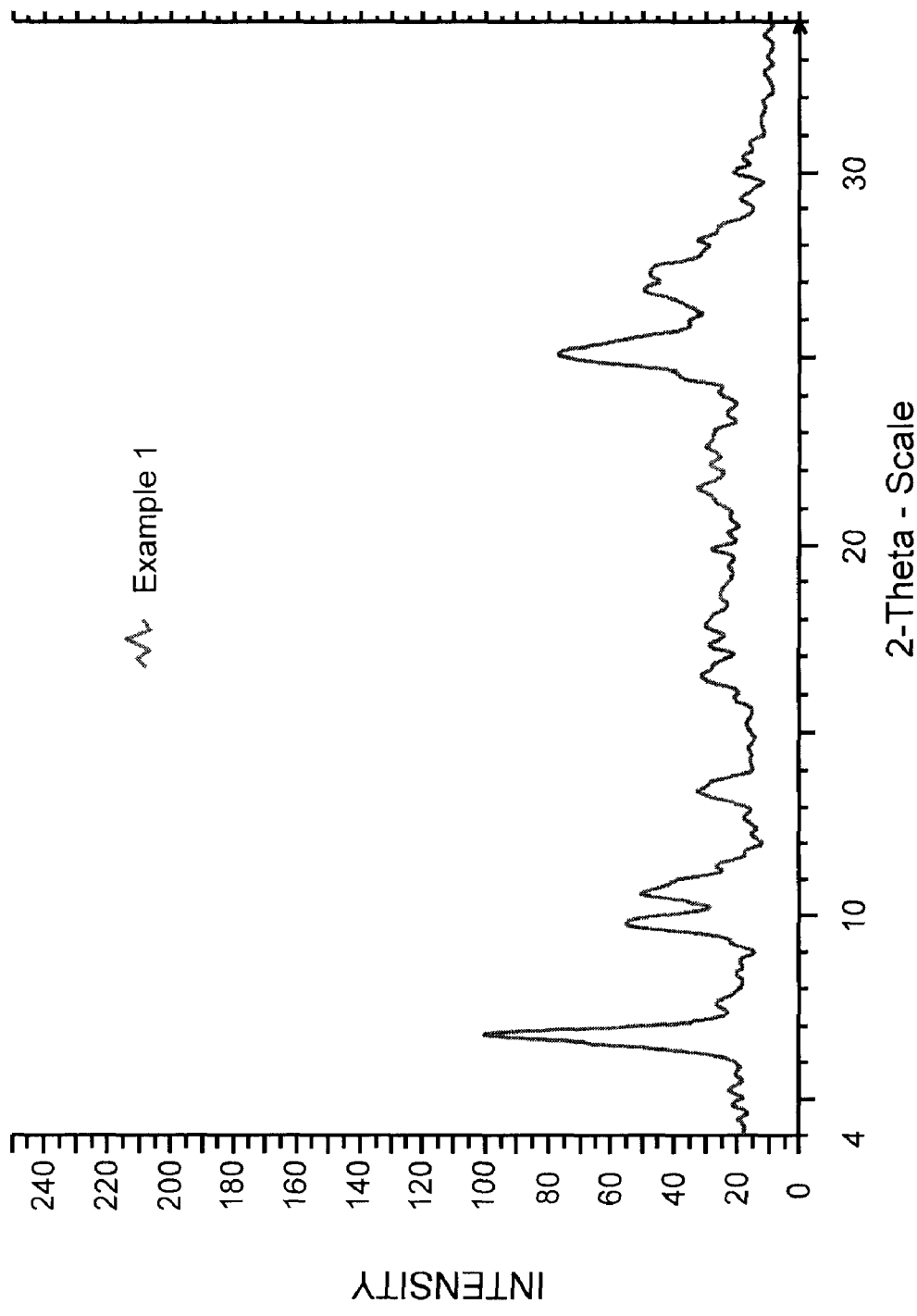
FIG. 3 is the XRD spectra of the pigment in Example 1.
Figure 4:
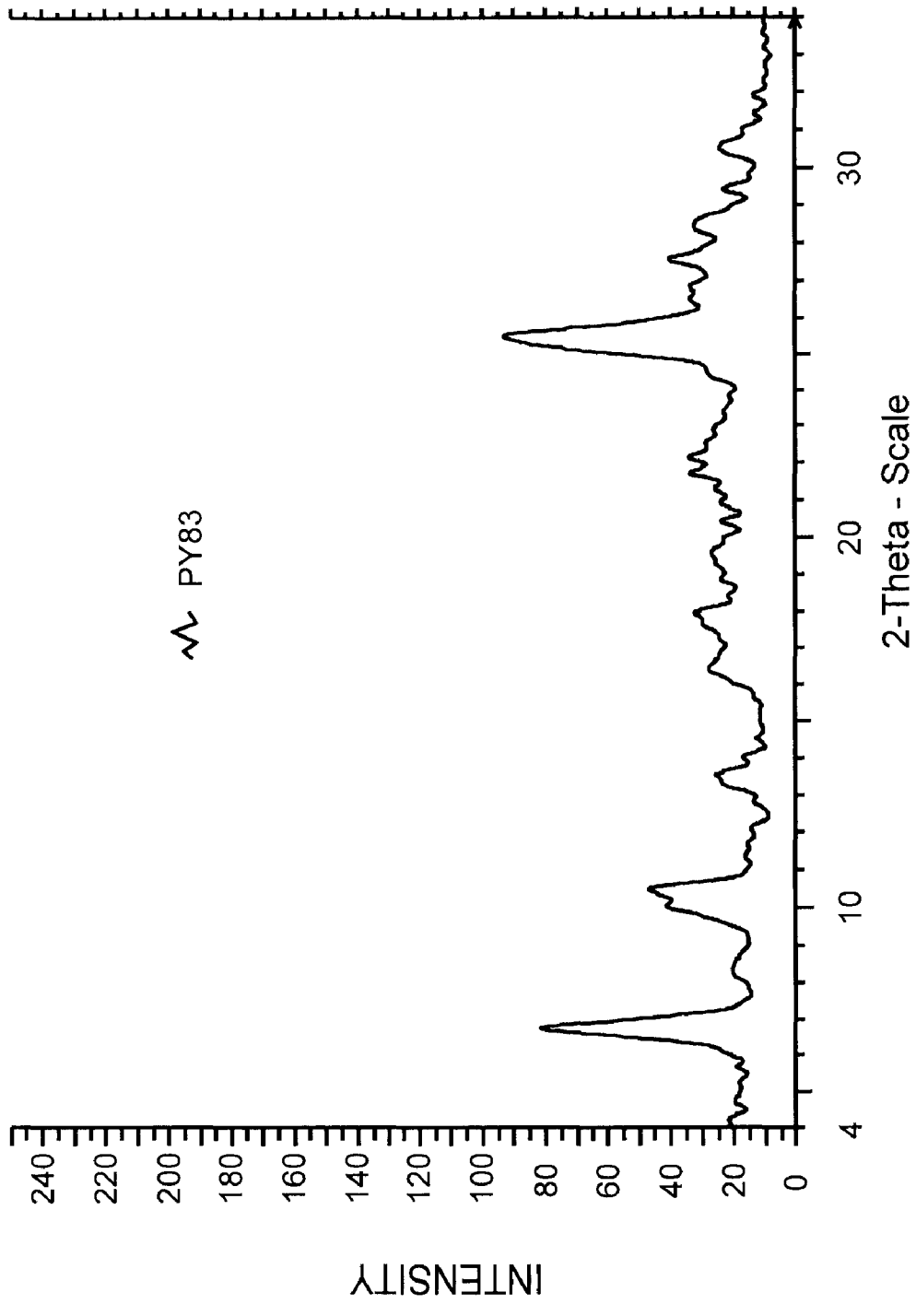
FIG. 4 is the XRD spectra of the pigment in Example 2, C.I. Pigment Yellow 83.
Figure 5:
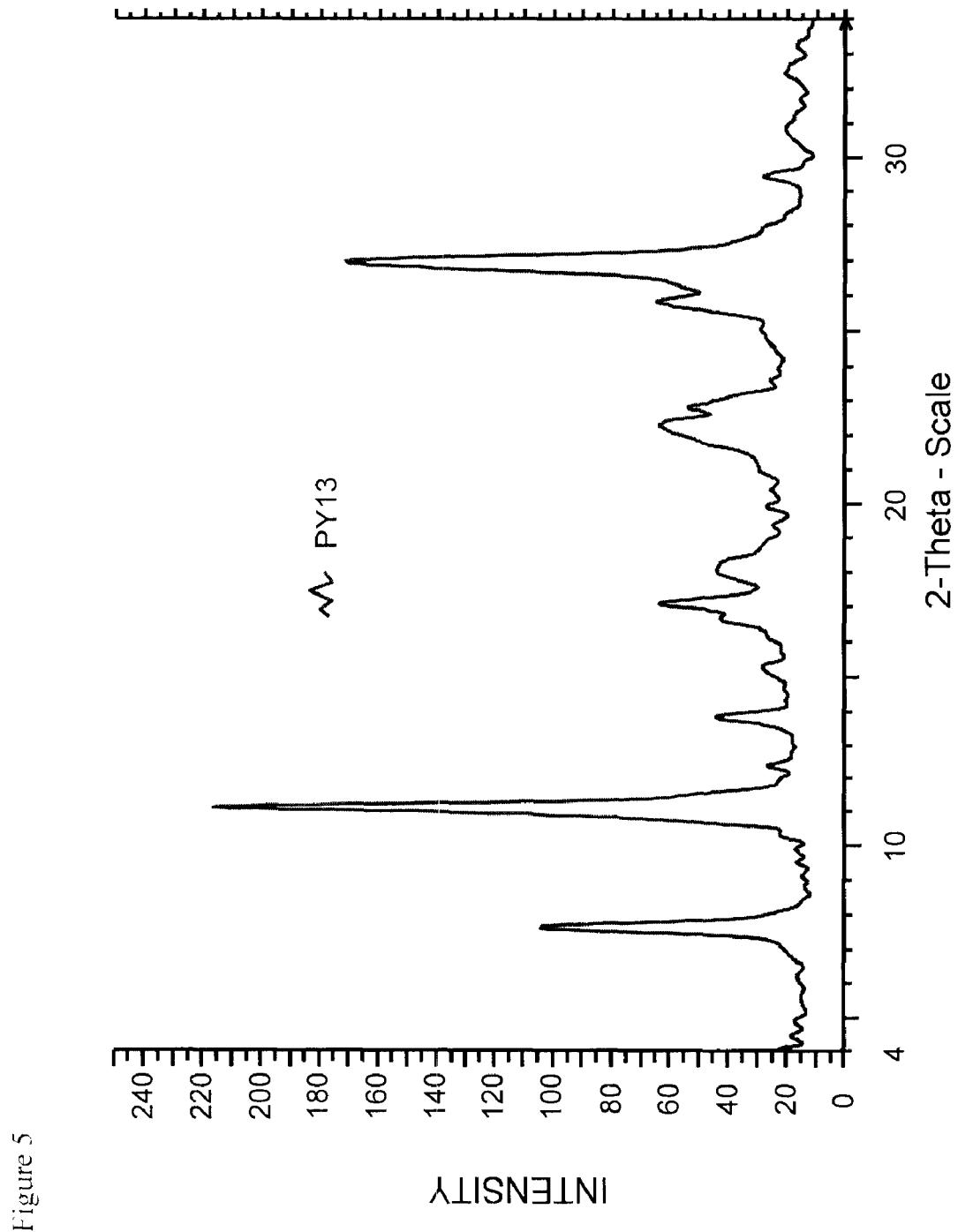
FIG. 5 is the XRD spectra of the pigment in Example 7, C.I. Pigment Yellow 13.
Figure 6:
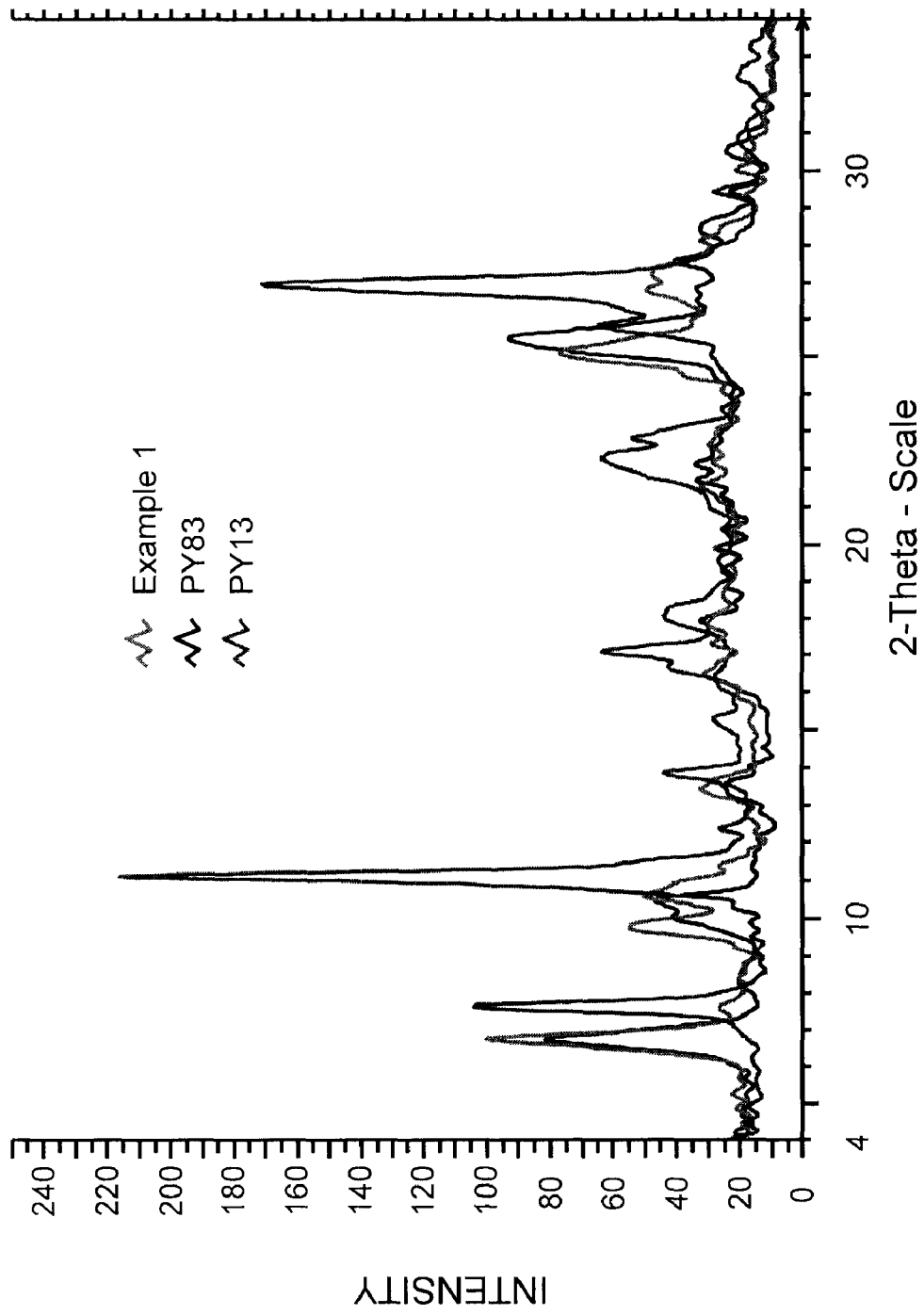
FIG. 6 is the XRD spectra of the pigment in Example 1, C.I. Pigment Yellow 83, and C.I. Pigment Yellow 13.

The dry pigments of examples 1-7 were examined by x-ray diffraction using an angle scanning procedure on the powder samples (Cu $K_\alpha$) Diffraction patterns of the pigments from example 1, 2, and 7 are depicted individually in FIGS. 3-5 and overlaid in FIG. 6. The close resemblance of the spectra for the pigments of example 1 and 2 reveals the existence of a solid solution between Pigment Yellow 83 and Pigment Yellow 176 that has a structure close to that of PY83. The intensity variation of one of the resulting peaks)(2Θ=6.7°) with pigment composition is depicted in FIG. 2. There is a good correlation between peak intensity and shade, see FIGS. 1 and 2. It should be noted that the peak intensity drops dramatically when the composition approaches that of C.I. Pigment yellow 13.

Commercially available C.I. Pigment Yellow 83, C.I. Pigment Yellow 13, and the pigment in example 1 were analyzed for their content of primary aromatic amines using an ETAD agreed HPLC method on methanol/hydrochloric acid extracts. Both 4-chloro-2,5-dimethoxy-aniline and 2,4-dimethyl-aniline were identified in the analysis. The findings are listed in the table below and show a decreasing content of primary aromatic amines in the final product when 4-chloro-2,5-dimethoxy-acetoacetanilide is replaced with 2,4-dimethyl-acetoecetanilide.

| Sample | w/w % AAMX | HR aniline | MX aniline | Total aniline |
|---|---|---|---|---|
| Pigment Yellow 83 | 0 | 1479 | 0 | 1479 |
| Example 1 | 50 | 210 | 14 | 224 |
| Pigment Yellow 13 | 100 | <1 | 20 | 20 |

Application Example 2

The dry pigments of example 8 and 9 were evaluated in extruded polyethylene chips as follows: In a 9 oz. jar fitted with an osterizer cap were combined 55.75 g of LDPE powder, 1.85 g of zinc stearate, 7.03 g of titanium dioxide and 0.3700 g of pigment. The mixture was osterized 3 times for 30 seconds each using a high speed osterizer. The final material was quantitatively transferred to a plastic bag containing 305 g of LDPE powder. The bag was shaken for 1 minute to produce a homogeneous molding material. Injection molding of this material was carried out at 205° C. using standard procedures. Representative polyethylene chips of both samples were evaluated using an ACS color match computer. Compared to the pigment of example 9, the pigment of example 8 turned out more red as the measurement of dA is +0.32.

Commercially available Pigment Yellow 83 and the dry pigment from example 8 were analyzed for their content of primary aromatic amines using the same method as described above. The results given in the table below again show a reduction of primary aromatic amines when 4-chloro-2,5-dimethoxy-acetoacetanilide is replaced.

| Sample | w/w % AAMX | HR aniline | MX aniline | Total aniline |
|---|---|---|---|---|
| Pigment Yellow 83 | 0 | 694 | 0 | 694 |
| Example 8 | 43 | 325 | 45 | 370 |

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A diarylide yellow pigment produced from a process comprising: coupling tetrazotized 3,3'-dichlorobenzidine and a mixture comprising 25-90% by weight of 4-chloro-2,5-dimethoxy-acetoacetanilide and 75-10% by weight of 2,4-dimethyl-acetoacetanilide; where the resulting diarylide yellow pigment is a solid solution.

2. The diarylide yellow pigment of claim 1, where the pigment has a redder color than C.I. Pigment Yellow 83.

3. The diarylide yellow pigment of claim 1, where the pigment has X-ray diffraction pattern Bragg angles at 6.7°, 10.0°, 25.4°, 28.5° and 30.5° (approximate 2Θ values, Cu $K_\alpha$) or an absence of peaks at 7.5°, 11.0° and 26.9° (approximate 2Θ values).

4. The diarylide yellow pigment of claim 1, where the mixture comprises from about 30% to about 70% by weight of 4-chloro-2,5-dimethoxy-acetoacetanilide and from about 70% to about 30% by weight of 2,4-dimethyl-acetoacetanilide.

5. The diarylide yellow pigment of claim 4, where the pigment has an X-ray diffraction pattern Bragg angles at 6.7°, 9.7°, 10.5°, 25.2° and 26.9° (approximate 2Θ values, Cu $K_\alpha$) or an absence of peaks at 11.0° (approximate 2Θ values).

6. The diarylide yellow pigment of claim 5, where the mixture comprises from about 35 to about 65% by weight of 4-chloro-2,5-dimethoxy-acetoacetanilide and from about 65% to about 35% by weight of 2,4-dimethyl-acetoacetanilide.

7. The diarylide yellow pigment of claim 1 comprising less than 500 ppm of an aromatic amine.

8. The diarylide yellow pigment of claim 1 comprising no aromatic amine.

9. A substrate colored with the pigment from claim 1.

10. Printing inks colored with the pigment from claim 1.

11. Plastics colored with the pigment from claim 1.

12. Paints colored with the pigment from claim 1.

13. Polymeric materials colored with the pigment from claim 1.

* * * * *